US012375364B2

(12) United States Patent
Sakazi et al.

(10) Patent No.: US 12,375,364 B2
(45) Date of Patent: Jul. 29, 2025

(54) INTELLIGENT AUTO-DETECTION OF ANOMALOUS WEB-BASED ACCESS REQUESTS

(71) Applicant: Microsoft Technology Licensing, LLC, Redmond, WA (US)

(72) Inventors: Shay Chriba Sakazi, Herzliya (IL); Shalom Shay Shavit, Yehud (IL); Andrey Karpovsky, Kiryat Motzkina (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 173 days.

(21) Appl. No.: 18/319,080

(22) Filed: May 17, 2023

(65) Prior Publication Data
US 2024/0388505 A1 Nov. 21, 2024

(51) Int. Cl.
*H04L 41/147* (2022.01)
*H04L 43/02* (2022.01)

(52) U.S. Cl.
CPC ............ *H04L 41/147* (2013.01); *H04L 43/02* (2013.01)

(58) Field of Classification Search
CPC .............................. H04L 41/147; H04L 43/02
See application file for complete search history.

(56) References Cited

U.S. PATENT DOCUMENTS

| | | | |
|---|---|---|---|
| 2020/0053111 | A1 | 2/2020 | Jakobsson |
| 2020/0280573 | A1 | 9/2020 | Johnson |
| 2021/0400062 | A1* | 12/2021 | Shtar ................... H04L 63/1416 |
| 2022/0417275 | A1* | 12/2022 | Jones .................. H04L 63/1483 |

OTHER PUBLICATIONS

Rahal et al., "A Distributed Architecture for DDoS Prediction and Bot Detection", IEEE Access, vol. 8, Jan. 1, 2020.*
(Continued)

*Primary Examiner* — Todd L Barker
(74) *Attorney, Agent, or Firm* — Holzer Patel Drennan

(57) ABSTRACT

A system for dynamically determining the legitimacy of a source internet protocol (IP) address requesting access to a target resource includes an address classifier, a resource similarity identifier, and a connection legitimacy prediction engine. The IP address classifier classifies the source IP address into a relevant address group selected from among a plurality of address groups. Each of the address groups consist of IP addresses that satisfy at least one address similarity criterion. The resource similarity identifier identifies a group of similar resources for the target resource based commonalities in a first subset of the address groups that have previously accessed the target resource and subsets of the address groups that have accessed each of the similar resources. The connection legitimacy prediction engine compute a probability of receiving a legitimate new request to access the target resource from the relevant address group based on connection history data associated with the relevant address group and each of the similar resources. The system denies the request to access the target resource in response to determining that the probability falls below a defined threshold.

20 Claims, 6 Drawing Sheets

(56) References Cited

OTHER PUBLICATIONS

Alohaly et al, "Integrating Cyber Deception Into Attribute-Based Access Control (ABAC) for Insider Threat Detection", IEEE Access, Jan. 1, 2022.*
Mishra et al,, "A Detailed Investigation and Analysis of Using Machine Learning Techniques for INnrustion Detection" Jan. 1, 2019.*
Doshi et al, "Machine Learning DDoS Detection for Consumer Internet of Things Devices", IEEE Security and Privacy Workshops, May 24, 2018.*
International Search Report and Written Opinion received for PCT Application No. PCT/US2024/025909, Jul. 16, 2024, 14 pages.
"CyberML-Anomalous Access Detection", Retrieved from: https://microsoft.github.io/SynapseML/docs/features/other/CyberML%20-%20Anomalous%20Access%20Detection/, Retrieved Date: Feb. 12, 2023, 9 Pages.

* cited by examiner

INTELLIGENT AUTO-DETECTION OF ANOMALOUS WEB-BASED ACCESS REQUESTS

BACKGROUND

Cloud resources are used extensively by both users and businesses for data storage, web application services, and data processing of various user-initiated compute tasks. In a given day, a cloud resource provider may receive millions of requests from external internet protocol (IP) address to access various web-based assets, such as storage accounts and web applications. A small fraction of these requests are malicious and are, for example, initiated by bots or humans trying to gain unauthorized access to data.

To detect these malicious access attempts, cloud security vendors supply different solutions. In a typical approach, a security provider implements a firewall configured to selectively block or grant access requests based on whether or not the requesting source IP address appears on a list of prohibited IPs. For example, a firewall may dynamically maintain a "blacklist" of prohibited IPs based on detected patterns of suspicious access and/or static rules.

SUMMARY

Figure 1:
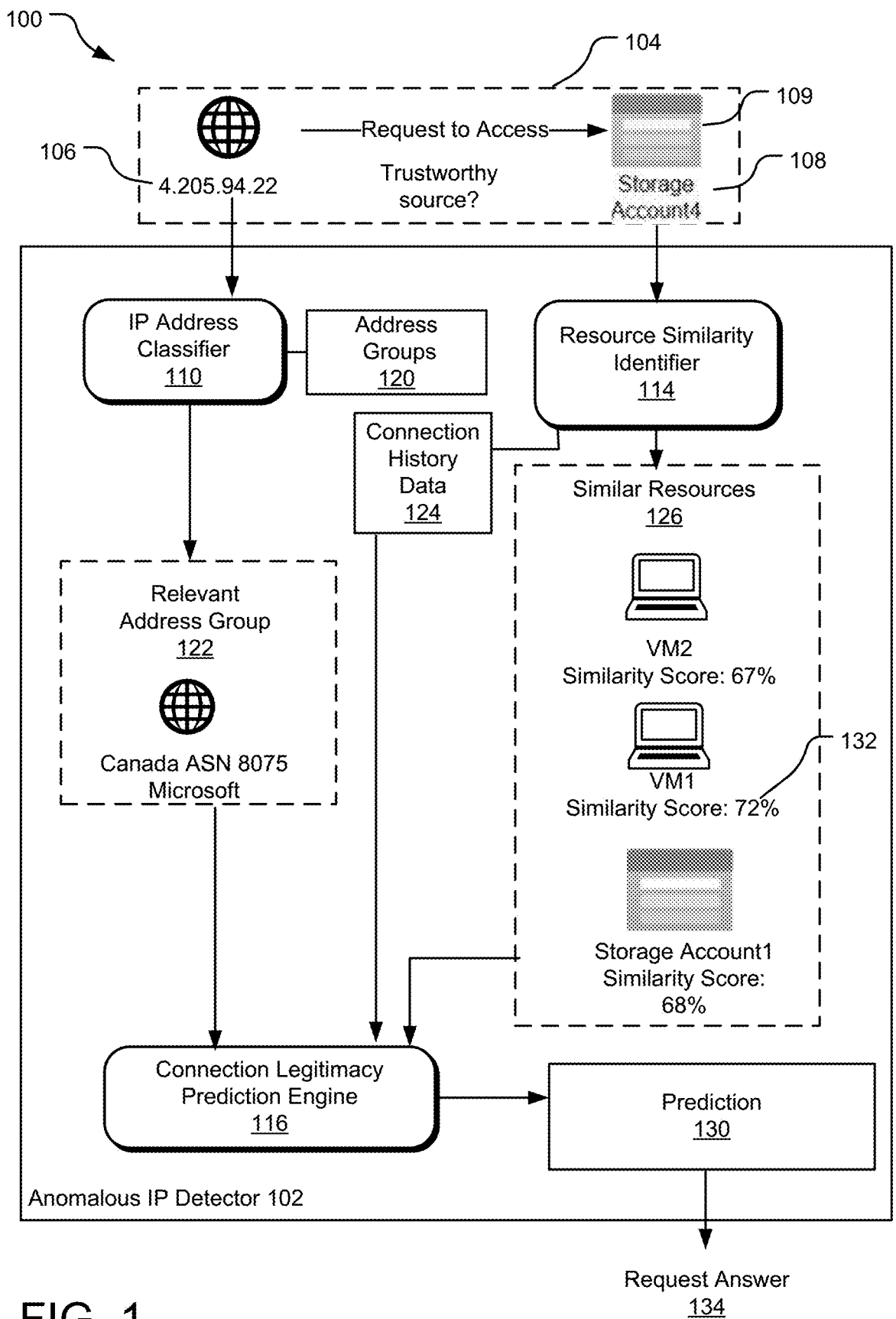
FIG. 1 illustrates an example system for intelligently and automatically detecting anomalous web-based connection requests.

According to one implementation, a method for determining legitimacy of a source internet protocol (IP) address requesting access to a target resource includes identifying a relevant address group for the source IP address from among a plurality of address groups that each consist of IP addresses satisfying an address similarity criterion. The method further provides for identifying a group of similar resources for the target resource based on commonalities in a first subset of the address groups that have previously accessed the target resource and subsets of the address groups that have accessed each of the similar resources, and for predicting a probability of receiving a legitimate new request to access the target resource from the relevant address group based on connection history data associated with the relevant address group and each of the similar resources. The method additionally provides for denying the request to access the target resource in response to determining that the probability falls below a defined threshold.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

Due to the high cardinality and virtualization of IP address ranges, address-based security enforcement is challenging problem. Malicious actors often use techniques such as IP spoofing, dynamic IP addresses, and other methods to mask their true identities. Consequently, a request from a malicious actor may deceptively appear to originate from a virtual machine managed by known legitimate entity when the actual origin is a server in a remote part of the world. In these scenarios, origin-based access rules are often ineffective at detecting the anomalous activity.

Further contributing to these enforcement challenges is the fact origin-based access rules can often trigger false detections in scenarios where a given server is accessing a particular resource for the first time. For example, an origin-based static rule may block a server in India from accessing a resource despite the fact that the server is located at data center managed by a party that manages other servers (with trusted IPs) in other parts of the world and also despite the fact that the server is requesting a resource that is commonly accessed by those other commonly-managed servers.

The use of exact IPs addresses for stateful anomaly detection is in most cases infeasible due to their dynamic nature and enormous numbers (for example, for IPv4 addresses there are $2^{32}$ possibilities and for IPv6 there are $2^{128}$ possibilities). While some anomaly detection techniques do provide for modeling the interaction between groups of IPs and individual cloud resources, these approaches are lacking in accuracy due largely to their failure to consider similar connections to different (related) resources. If, for example, a server is known to be part of a group of servers that commonly access a group of web-based accounts, this information is not useful in predicting the legitimacy of a request from one of these servers to access a new resource that was not previously accessed by any of the other server(s) in the group.

The herein disclosed technology provides a system capable of detecting anomalous (potentially malicious) IP addresses more accurately and with a lower false positive rate than the above-described prior approaches.

This improved accuracy of the disclosed system is attributable to a least two distinct techniques. First, the disclosed approach provides for clustering IP addresses based on a criterion or multiple criteria indicative of a similarity, such common ownership or co-location within a same geographic area. In one implementation, autonomous system number (ASN) is used to infer ownership and/or geographic location is derived based on the IP address. This meaningful clustering of IP addresses makes it easier to cope with their huge numbers, thereby reducing algorithmic complexity and consequently, processing complexity and compute power. This technique provides a more stable input for modeling normal vs. abnormal behavior. According to one implementation of the disclosed technology, a connection to a resource is modeled as being from an identified relevant group of IP addresses without regard to the individual source IP of the connection request.

In addition to the above, some implementations of the disclosed technology further apply a novel collaborative filtering (CF) algorithm on a constructed connection graph that maps prior connections between IP address groups (e.g., as discussed above) and individual cloud-based resources. This CF algorithm computes the similarities between different resources based on connection history data—specifically, based on overlaps in distinct subsets of the IP address groups that have previously accessed each of the resources. This measure of resource-to-resource similarity is used in computing a predictive metric that represents the likelihood that a given new request is legitimate, and therefore from a trusted source. The predictive metric computed for the new request is based on both (1) connection history data collected in association with a relevant IP address group (e.g., an address group associated with the source IP placing the connection request) as well as on (2) the connection history data associated with each of multiple resources identified as similar to the requested resource. Notably, this approach allows for meaningful predictions to be rendered even in scenarios where a requested resource has not been previously accessed in the past by any member of the corresponding relevant IP address group due to the use of the "similar resources" in computing the predictive metric.

FIG. 1 illustrates an example system 100 for intelligently and automatically detecting anomalous IPs requesting access to web-based resources. As used herein, an "anomalous IP" refers to a source IP address that is assigned to a server managed by a malicious actor or other untrustworthy source. An "anomalous request" therefore refers to a connection request that is from an anomalous IP—e.g., a party that does not have legitimate authorization to access a target resource being requested. A request that is non-anomalous is also referred to herein as a "legitimate request." The system 100 includes an anomalous IP detector 102, which may be understood as consisting of software or primarily software. The anomalous IP detector 102 performs actions to intelligently predict whether a connection request 104 is from an anomalous source IP address. In cases where it is determined that the connection request 104 is anomalous, the anomalous IP detector selectively denies the connection request 104.

The connection request 104 identifies a source IP address 106 and a resource identifier 108 uniquely identifying a target resource 109 for which access is requested. In FIG. 1, the resource identifier 108 is shown to include a simplified name of the target resource 109 (e.g., "StorageAccount4"). In actual implementations, the resource identifier 108 includes sufficient information to enable a security provider to uniquely identify the target resource 109 from among a large pool of resources that are either protected by the system 100 or otherwise used collectively in a training dataset used to train one or more models implemented by the system 100. The resource identifier 108 may, for example, identify a file path, virtual network configuration information, a virtual machine identifier, container identifier, a database ID, or other resource-identifying information.

The anomalous IP detector 102 includes several subcomponents, including an IP address classifier 110, a resource similarity identifier 114, and a connection legitimacy prediction engine 116, all of which may be understood as including software stored in memory of one or more different storage devices that is executed on either a single processing device or on multiple different processing devices (e.g., in a distributed fashion with many devices executing parallel instances of the anomalous IP detector 102 or with different devices performing different functions described below with respect to the different components of the anomalous IP detector 102).

Upon receipt of the connection request 104, the anomalous IP detector 102 provides the source IP address 106 to the IP address classifier 110. In turn, the IP address classifier 110 classifies the source IP address into a relevant address group (e.g., similar IP address group 118), which is selected from among multiple predefined address groups 120. Each of the multiple predefined address groups 120 includes a subset of IP addresses that satisfy an address similarity criterion or multiple address similarity criteria defined with respect to the group, such as a similarity pertaining to location and/or ownership.

In one implementation, the address groups 120 each include a collection of IP addresses associated with a same autonomous system number (ASNs), a same geographic location, or both. An ASN is a number corresponding to a list of internet routable prefixes belonging to an individual network or a collection of networks that are all managed, controlled, and supervised by a single entity or organization. Publicly-available databases exist that allow for retrieval of an ASN and an AS name (typically, the name of the entity or organization association with the ASN) based on an IP address. For example, the IP address "13.64.00" is associated in a publicly-available database with "ASN 8075" and AS name "Microsoft-Corp-MSN-AS-Block." Notably, some organizations may own multiple different ASNs used for different corporate divisions or to support different web applications, different types of storage resources, etc. However, even in these cases it is typically possible to identify the owner of an IP address based on the "AS name" associated with the ASN.

In one implementation, each different one of the address groups 120 includes IP addresses associated with a same ASN. In another implementation, each of the address groups 120 includes IP addresses associated with a same ASN and a same (single) geographic location, where the geographic location is, for example, a country, city, or a defined area of longitude and latitude that can be associated with the IP address. Take, for example, the ASN 8075 which is owned by Microsoft and associated with IP addresses across North America. In one implementation consistent with the above, the address groups 120 include a first address group including IP addresses associated with the ASN 8075 and the country "Canada" (e.g., Canada ASN 8075—Microsoft) and a second address group including IP addresses associated with the ASN 8075 and the country "USA" (e.g., USA ASN 8075, Microsoft). In still another implementation, a single one of the address groups 120 includes IP addresses owned by a same organization but that are individually associated with two or more different ASNs.

In the example of FIG. 1, the IP address classifier 110 receives the source IP address 106 (e.g., 4.205.94.22) and determines an ASN and geographic location (e.g., country) associated with the source IP address 106. Using the determined ASN and the geographic location, the IP address classifier 110 identifies a relevant address group 122 from the address groups 120. In the illustrated example, the relevant address group 122 is "Canada ASN 8075 Microsoft." The relevant address group 122 is provided to the connection legitimacy prediction engine 116, which uses a variety of other inputs to render a prediction 130 indicative of the legitimacy of the access request 104.

In order to render the prediction 130, the connection legitimacy prediction engine 116 receives and processes various inputs including resource identifiers for a collection of web-based resources identified as "similar" to the target resource 109 (referred to herein as "similar resources 126") and connection history data 124 pertaining to each of the similar resources 126.

In the system 100, the similar resources 126 are identified by the resource similarity identifier 114 based on a connection history similarity metric (e.g., a similarity score 132) computed with respect to the target resource 109 and each of multiple resources in a training dataset. In one implementation, the connection history similarity metric is based on a determined number of the address groups 120 that have previously accessed both the target resource 109 and the resource that is being compared to the target resource 109. For example, two resources that have both been accessed by a same one of the address groups are identified as more similar to one another than two resources that have not both been accessed by any one the address groups 120. In one implementation, the connection history similarity metric for a pair of resources is equal to a ratio of a number of the address groups that have accessed both of the resources in the pair divided by a total number of the address groups that have, in combination, accessed either or both resources of the pair of resources.

In one implementation, the resource similarity identifier 114 includes a machine learning model trained on a dataset that includes the connection history data 124 for an extensive group of resources (e.g., millions of cloud-based resources). The connection history data 124 includes data that indicates, for each different resource, which of the address groups 120 have accessed the resource in the past. Through a training process, the resource similarity identifier 114 is trained to quantify the similarity or non-similarity of each different pair of resources represented in the training dataset.

In the system 100, the resource similarity identifier 114 compares the connection history data 124 of the target resource 109 to the connection history data 124 to each other one of the training resources in the training data set. Based on overlaps in the connection history data 124 of the target resource 109 and the other resources, the resource similarity identifier 114 identifies the similar resources 126. Per this approach, similarity between two resources is based on a determined degree of overlap in the subsets of the address groups 120 that have previously accessed the different resources.

In FIG. 1, the resource similarity identifier 114 generates outputs that include resource identifiers for each of the identified similar resources 126 (e.g., resource identifier s VM2, VM1, StorageAccount1) as well as a connection history similarity metric (e.g., a similarity score 132) quantifying how similar each of the identified similar resources 126 is to the target resource 109. A more detailed example similarity score computation is discussed with respect to FIG. 2, below.

Using the connection history data 124 for each of the similar resources 126, the connection legitimacy prediction engine 116 next generates the prediction 130, which is indicative of the likelihood that the connection request 104 is anomalous (suspicious and/or from an untrustworthy and potentially malicious actor) as opposed to non-anomalous (legitimate and/or from a trusted source). In one implementation, the prediction 130 corresponds to a probability of receiving a new connection request to access to the target resource 109 from the relevant address group 122. The prediction 130 is rendered based on the connection history data 124 associated with the relevant address group 122 and with each of the similar resources 126 and more specifically, based on a likelihood of the relevant address group 122 accessing each of the similar resources 126. In some implementations, the prediction 130 is additionally based on the degree of similarity between each of the identified similar resources 126 and the target resource 109, as quantified by the connection history similarity metric (e.g., the similarity score 132).

The anomalous IP detector 102 outputs a request answer 134 that depends upon a probability indicated by the prediction 130 and that is, in some implementation, used by a security provider as a basis for granting or denying the connection request 104. For example, the connection request 104 is granted when the prediction 130 includes a probability exceeding a defined threshold and denied when the prediction includes a probability that is below the defined threshold. The defined threshold is, for example, identified during training of the anomalous IP detector 102 as being sufficient to guarantee a desired accuracy level, where "accuracy" refers generally to the percentage of requests that are, over a statistically significant number of training rounds, denied when the source IP 106 is actually malicious and/or granted when the source IP 106 is not malicious. For example, guaranteeing the "target accuracy" may depend upon correctly identifying anomalous requests to within a defined margin of error and may also depend upon not exceeding a cap set on the false positivity rate.

In one implementation, the anomalous IP detector 102 is implemented by a firewall to dynamically determine whether to grant or deny each received request to a resource protected by the firewall.

Figure 2:
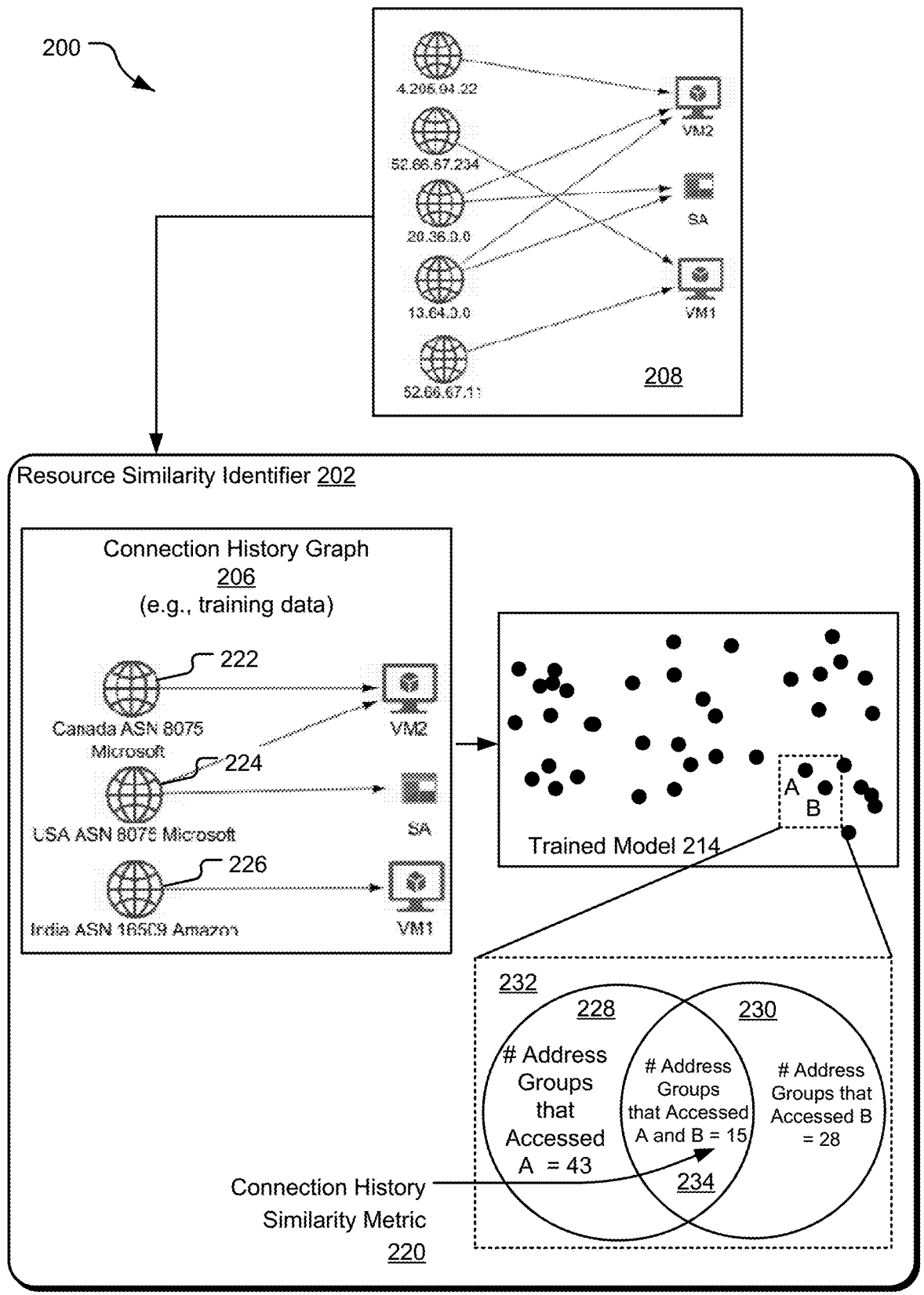
FIG. 2 illustrates example operations for training a resource similarity identifier to identify similar web-based resources based on commonalities in connection history data stored for multiple resources.

FIG. 2 illustrates example operations 200 for training a resource similarity identifier 202 to identify similar web-based resources based on commonalities in connection history data stored for multiple resources. In one implementation, the resource similarity identifier 202 is implemented in a system the same or similar as that described to FIG. 1 and performs some or all of the functionality described with respect to the resource similarity identifier 114 of FIG. 1.

During an initial data collection step, the resource similarity identifier 202 receives connection history data 208 (e.g., access logs) for various web-based resources in a data plane. The data plane includes, for example, an extensive collection of resources available at millions of server nodes protected by a security system implementing the disclosed technology for detecting anomalous access requests. The connection history data 208 includes prior connection request information indicating which IP addresses have previously accessed each of the resources in the data plane over a given time interval. The time interval spanned by the connection history data 208 may be variable in different implementations but is, in general, a sufficient amount of time to characterize patterns of data access, such as a few months or longer.

Upon receiving the connection history data 208, the resource similarity identifier 202 enriches the connection history data 208 with additional IP-specific information such as by adding an ASN associated with each source IP address in the dataset and/or an owner (entity) associated with the ASN, and/or by adding location information to each source IP address in the dataset such as a country, city, or other geographical identifier.

Following the annotation of the connection history data 208 with the above-described enrichment information (e.g., ASN, IP address owner, and/or geographic location), the different source IP addresses represented within the connection history data 208 are classified into address groups based on shared properties, such as shared ASN, common IP address owner (e.g., entity), and/or common geographic location, and the data is aggregated to a higher level of granularity by replacing each source IP address with an identifier for the associated address group. The resulting dataset is simplified in that each connection is now modeled as a connection between an address group (e.g., address groups 222, 224, 226) and a resource rather than as an individual IP address and the resource.

By example, FIG. 2 illustrates various connections in the connection history data 208 that are aggregated and simplified within a connection history graph 206. For instance, the connection history data 208 illustrates two IP addresses (e.g., 20.36.00 and 13.64.00) that each access a same virtual machine (VM2) and a same storage account (SA). These two addresses are associated (e.g., in a public database) with the United States and are both assigned to ASN 8075, which is owned by Microsoft. Accordingly, the aggregated data shown by a connection history graph 206 merges the two different pairs of connections from the IP addresses 20.36.0.0 and 13.64.0.0 into a single pair of connections extending from an address group 224 (e.g., "USA ASN 8075") to each of two resources (VM2, SA). The resulting aggregated, simplified dataset is used as training data to train a machine learning model (e.g., generating trained model 214). This training dataset can be represented by a bipartite graph that has the form of the connection history graph 206.

In one implementation, the resource similarity identifier 202 uses the training data (e.g., data within the connection history graph 206) to generate a feature vector for each different resource represented in the connection history data 208. The feature vector indicates which of the address groups have previously-accessed the resource in the past (e.g., within the time period spanned by the training data). For example, a feature vector for each different one of the resources included in the training dataset includes a different index corresponding to each different one of the address groups (e.g., 222, 224, 226), where the index indicates whether the associated address group did access the given resource (e.g., if the index is '1') or did not access the given resource (e.g., if the index is 0).

The trained model 214 includes a set of weights that are refined, through the training process, to transform the feature vectors for each of the resources into higher dimensional vectors defined within a same latent space. These higher dimensional vectors are referred to herein as resource vectors and are represented as dots in the trained model 214 shown in FIG. 2. Within the trained model 214, the relative spacings between each pair of the resource vectors correlates with a learned degree of similarity between the two corresponding resources.

In one implementation, the resource similarity identifier 202 computes a connection history similarity metric 220 for each pair of the resources and then determines (by repeatedly refining model weights throughout an iterative training process) the model weights sufficient to transform the input feature vectors into a set of resource vectors that are spaced according to the respective similarity of each resource pair, where similarity is measured by the associated connection history similarity metric 220.

By example, the connection history similarity metric 220 (shown in View 232) is computed for resources, A and B, based on a Jaccard similarity. In this example, the Jaccard similarity is measured based on degree of overlap in identified subsets 228, 234 of the address groups (e.g., the address groups 222, 224, 226) that have previously accessed the different resources A and B. In the example shown, the subset 228 includes all address groups in the training dataset that have previously accessed resource A. The subset 230 includes all address of groups in the training dataset that have previously accessed resource B. An intersection subset 234 represents an overlap in the subsets 228 and 230—specifically, the subset of the address groups in the training dataset that accessed both A and B. In the example shown, the number of address groups appearing in the intersection subset 234 (e.g., 15 address groups) represents the connection history similarity metric 220. The ratio of this number (e.g., 15) to the total collective number of groups included in subsets 228 and 232 indicates a degree of similarity of A to B. As this ratio increases, the resources A and B are considered to be more similar. As this number decreases, the resources A and B are considered to be less similar.

Other implementations may employ other types of similarity metrics different than the Jaccard similarity that likewise characterize commonalities in the connection history data 208 to measure similarity for each pair of the resources. In each implementation, the trained model 214 defines the resources in a manner that allows for an efficient comparison of similarities in their corresponding connection history data. In FIG. 2, the resources are mapped to resource vectors in same latent space with spacing between each pair of the vectors being proportional to the relative similarity indicated by the connection history similarity metric 220 computed for the pair of the resources. In this implementation, the resource vectors can easily be compared, such as by computing a dot product or cosine similarity, to assess their relative similarity.

Figure 3:
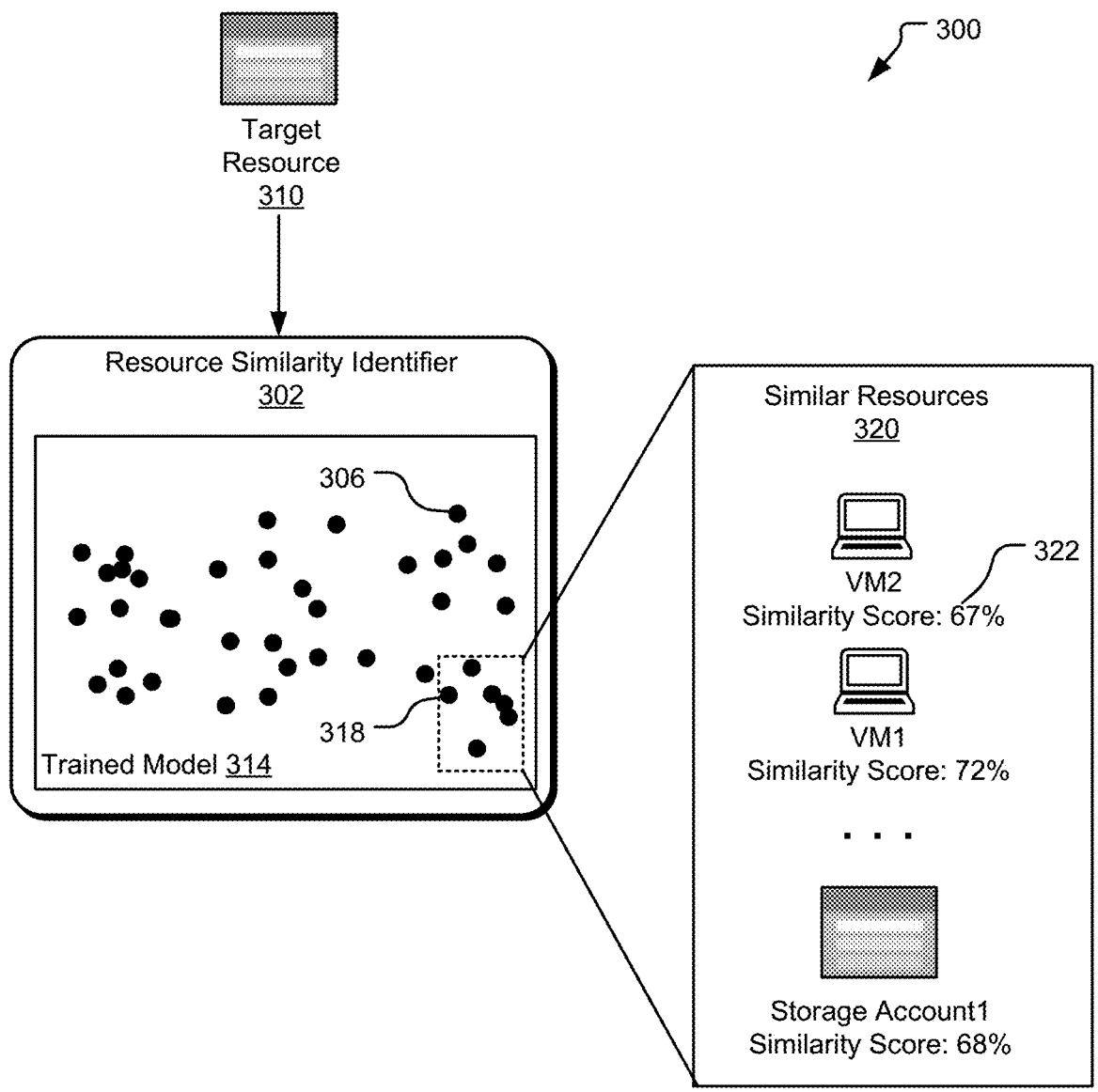
FIG. 3 illustrates example operations of a system that identifies similar web-based resources based on commonalities in connection history data.

FIG. 3 illustrates example operations of a system 300 implementing a resource similarity identifier 302 that identifies similar web-based resources based on commonalities in connection history data. In on implementation, the resource similarity identifier 302 is incorporated within a larger system with components the same or similar to those shown in FIG. 1. In the example shown, the resource similarity identifier 302 includes a trained model 314 that includes resource vectors (e.g., a resource vector 306) corresponding to resources in a training dataset. The resource vectors are defined within a vector space in which the relative spacing between each pair of resource vectors correlates with a learned degree of similarity, such as a similarity quantified by the connection history similarity metric discussed above with respect to FIG. 2.

In the example illustrated, the resource similarity identifier 302 receives as input a target resource 310 that is being requested by source IP address. The resource similarity identifier 302 uses the trained model 314 to identify a set of resources (shown as "similar resources 320") that satisfy one or more predefined similarity criterion when compared to the target resource 310. Upon receiving a resource identifier for the target resource 310, the trained model 314 locates a resource vector 318 that corresponds to the target resource 310. Since the resource vectors are distributed according to the relative similarity (e.g., based on the connection history similarity metric 220 of FIG. 2), the resource similarity identifier 302 can quickly identify a set of resource vectors that are similar enough to the resource vector 318 to satisfy the predefined similarity criterion.

The number of the similar resources output by the resource similarity identifier 302 may vary in different implementations depending on various model-specific similarity criteria. In one implementation, the resource similarity identifier 302 locates a predefined number of the resource vectors that are closest to (and therefore most similar to) the resource vector 318 of the target resource 310. In another implementation, the similar resources 320 consist of resources that have a relative similarity when compared to the target resource 310 in excess of a defined threshold (e.g., a similarity score 322 that exceeds a defined value).

Figure 4:
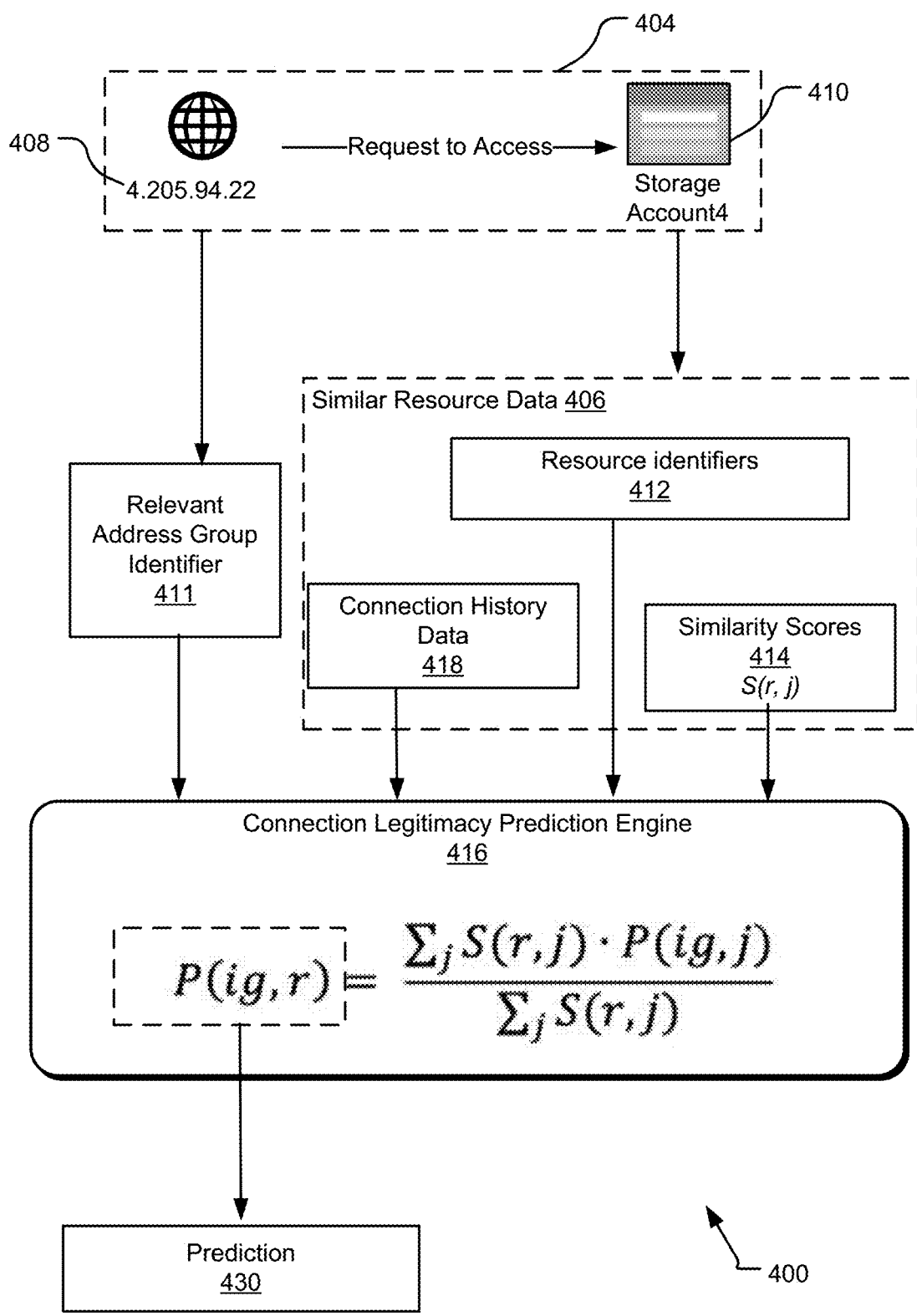
FIG. 4 illustrates aspects of another example system that intelligently predicts whether a web-based connection request is anomalous based on resources identified as similar to a requested resource.

In an implementation discussed in further detail with respect to FIG. 4, the resource similarity identifier 302 outputs resource identifiers for the similar resources 320 as well as similarity scores (e.g., the similarity score 322). The similarity score 322 is one example of the connection history similarity metric 220 discussed with respect to FIG. 2 and represents a quantification of similarity between the target resource 310 and the associated one of the similar resources. This similarity score, along with the connection history data for the associated resource (e.g., a corresponding feature vector used to train the trained model 314), is used to generate a prediction generally representing a likelihood that a received request for the target resource 310 is non-anomalous (e.g., legitimate, and not from a malicious actor).

FIG. 4 illustrates aspects of another example system 400 that intelligently predicts whether a connection request 404 is anomalous. Like other implementations described herein, this prediction is performed based on an assessment of connection history data pertaining to IP addresses similar to the source IP of the request and of resources similar to the requested resource.

Aspects of FIG. 4 illustrate example inputs, outputs, and operations of a connection legitimacy prediction engine 416, which is in one implementation included within a system with components the same or similar to those described with respect to FIG. 1. In FIG. 4, the connection legitimacy prediction engine 416 is shown as receiving a relevant address group identifier 411 and similar resource data 406, each of which are derived or determined from aspects of the connection request 404 such as in a manner consistent with the descriptions of the relevant address group 122 (described with respect to FIG. 1) and similar resources 126 (also described with respect to FIG. 1) or the similar resources 320 (described with respect to FIG. 3).

The relevant address group identifier 411 identifies an IP address group that has been identified as being relevant to a source IP 408 of the resource action request due to a similarity shared by the source IP 408 and other IP addresses in the address group identified by the relevant address group identifier 411. For example, the relevant address group identifier 411 identifies a group of IP addresses that are jointly owned (e.g., sharing a same ASN) and/or that are located in a same geographic location (e.g., a location associated with the IP addresses in a publicly-accessible database). For example, the relevant address group identifier may be "USA 8075 Microsoft," which identifies a group of IP addresses owned by Microsoft assigned to servers in the USA.

The similar resource data 406 includes information pertaining to resources identified as similar to a target resource 410 requested by the connection request 404, some or all of which is determined by and/or output from a trained model having characteristics the same or similar to the resource similarity identifier 302. The similar resource data 406 includes resource identifiers 412 that identify each of multiple resources identified as similar to the target resource 410, where similarity is measured based on commonalities in connection history data of the target resource 410 and the other resources. Additionally, the similar resource data 406 includes similarity scores 414, and specifically, a different similarity score that is computed between the target resource 410 and each of the identified similar resources. In FIG. 4, each of the similarity scores 414 is represented in FIG. 4 by the function S(r, j), which refers to a connection history similarity metric that is computed between the target resource 410 (r) and a select one of the target resources (j). In one implementation, the similarity scores are computed the manner described with respect to FIG. 2.

In addition to the resource identifier 412 and similarity scores 414, the connection legitimacy prediction engine 416 also receives as input connection history data for each of the identified similar resources. In one implementation, the connection history data 418 for each of the similar resources includes a vector with a different index associated with each one of the address groups known to the system 400. Each index indicates whether the associated address group did or did not previously access the resources.

With the above-described inputs, the connection legitimacy prediction engine 416 computes a probability (P) of receiving a legitimate new connection request to access r, the target resource 410, from the relevant address group (ig) that is identified by the relevant address group identifier 411. As shown in FIG. 4, this prediction is given by an equation:

$$P(ig, r) = \frac{\sum_j s(r, j) \cdot P(ig, j)}{\sum_j s(r, j)}$$

In the above equation, j represents the set of indices in J, where J is the set of similar resources to resource r. S(r, j) represents the similarity between the target resource r and the similar resource j (e.g., the connection history similarity metric discussed elsewhere herein), and P(ig, j) is the probability of the relevant address group (ig) accessing the similar resource j (e.g., summed over all of the similar resources, as shown). In a simplified implementation, the probability term on the right (P(ig, j)) is a '1' in cases where the relevant address group has previously accessed the similar resource j and is a '0' in cases where the relevant address group has not previously accessed the similar resource, j. If the relevant address group has never accessed any of the similar resources in the set J, the formula above yields a 0% probability of the relevant address group accessing the target resource. If, in contrast, the relevant address group has accessed some of the similar resources, this increases the probability of the connection request 404 as being legitimate. Notably, the above formula weights the computed probability terms by the degree of similarity between the target resource 410, r, and each similar resource, j, meaning that the output probability tends to be higher when similar resources j have connection history data (e.g., pertaining to other address groups) that is, overall, more similar to the connection history data of the target resources, r, than in scenarios where the similar resources and the target resource 410 have been jointly accessed by fewer individual address groups and/or significantly different address groups.

In general, the above formula allows the system 400 to meaningfully compare resources based on similarities in connection history data and infer, on this basis, how likely a given address group (ig) is to access a target resource (r) based on past connections between the given address group and the similar resources (j) and also based on the degree of similarity (S(r,j)) of each of those resources to the target resource 410. As a result, this method can provide more accurate and personalized predictions over previous existing approaches.

In the system 400, the connection legitimacy prediction engine 416 outputs the computed probability (P(ig, r)) as a prediction 430 that is, in turn, usable to infer whether the connection request 404 from an anomalous IP. The prediction 430 is, for example, a probability of 1-100, where 100 represents absolute certainty that the connections request 404 is legitimate and 0 represents absolute certainty that the request is anomalous. In actual implementations, a system implementing the connections legitimacy prediction engine 416 is configured to grant the connection request 404 when the prediction 430 satisfies defined criteria (e.g., meets or exceeds a probability threshold) and to deny the connection request 404 when the prediction 430 does not satisfy the criteria (e.g., falls below the threshold).

Figure 5:
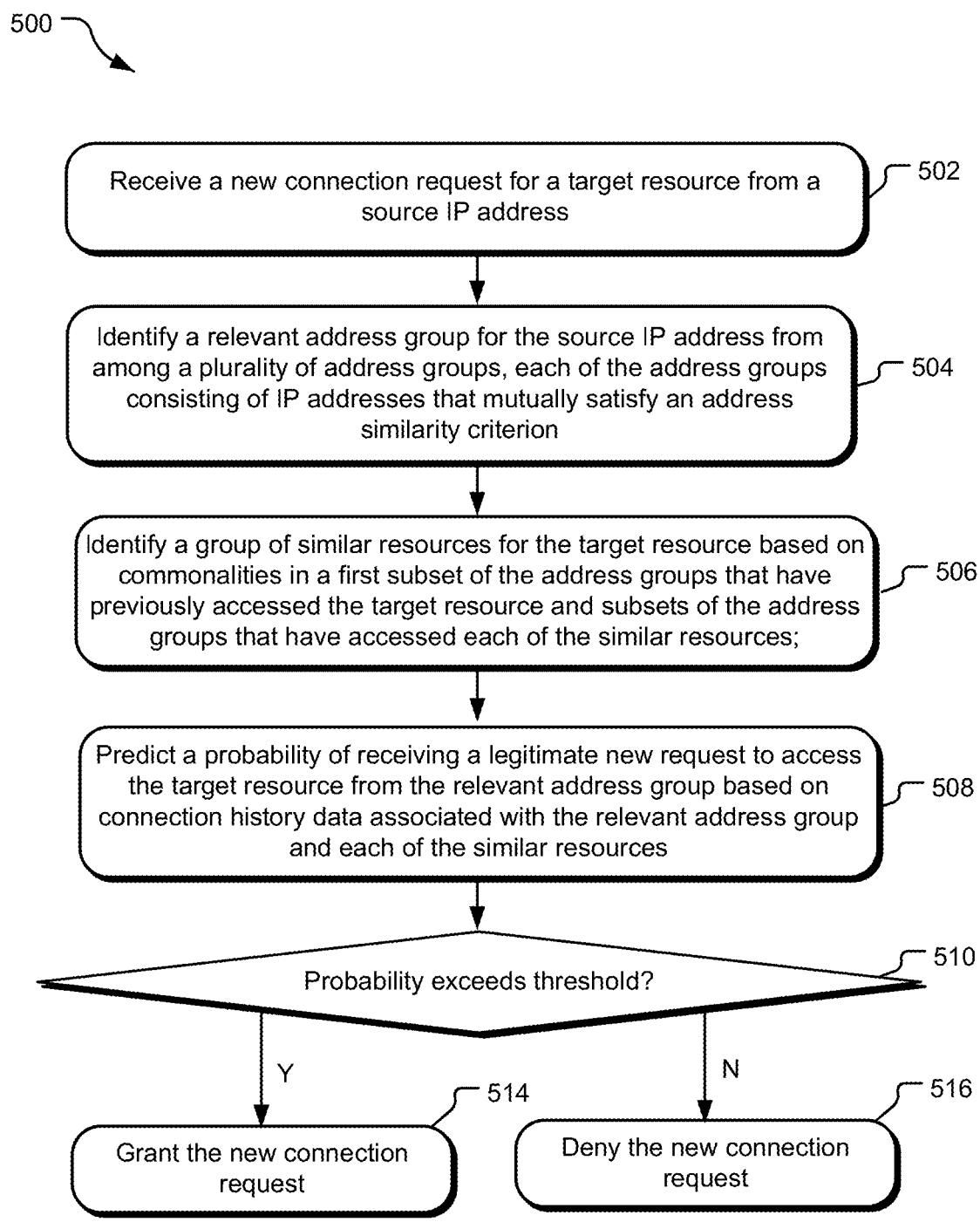
FIG. 5 illustrates example operations for intelligently predicting whether a web-based access request is anomalous.

FIG. 5 illustrates example operations 500 for intelligently predicting whether a web-based access request is anomalous. A receiving operations 502 receives a new connection request from a source IP address. The connection request specifies a target resource which is, for example, a cloud-based storage account, virtual machine, or third-party owned web application. An identifying operation 504 identifies a relevant address group for the source IP address from among a plurality of address groups that each include IP addresses that satisfy an address similarity criterion or multiple address similarity criteria defined for the group.

similarity criteria defined and, in some implementations, multiple address similarity criteria. For example, the IP addresses in a same address group are all associated with a same ASN and/or geographic region such as country or city. Another identification operation 506 identifies a group of resources similar to the target resource ("similar resources") based on commonalities in a first subset of the address groups that have previously accessed the target resource and other subsets of the address group that have accessed each of the similar resources. In one implementation, the identification operation 506 is performed by a trained model with characteristics same or similar to the trained model discussed with respect to FIGS. 2 and 3.

A prediction operation 508 predicts a probability of receiving a legitimate new request to access the target resource from the relevant address group based on connection history data associated with the relevant address group and each of the similar resources. In some implementations, the prediction is further based on a determined degree of similarity of the target resource to each of the similar resources, such as based on a connection history similarity metric (e.g., as discussed with respect to FIG. 2) and/or based on the prediction computation described with respect to FIG. 4.

A determining operation 510 determines whether determined probability exceeds a predefined threshold. If the probability exceeds the threshold, a grant operation 514 allows the new connection request. If the probability does not exceed the threshold, a denial operation 516 denies the new connection request. The defined threshold is, for example, set to guarantee that a desired percentage (e.g., 99% or higher) of requests are correctly denied when the source IP is actually malicious with a false positivity rate (e.g., of denials to non-malicious IPs) within a predefined acceptable margin.

Figure 6:
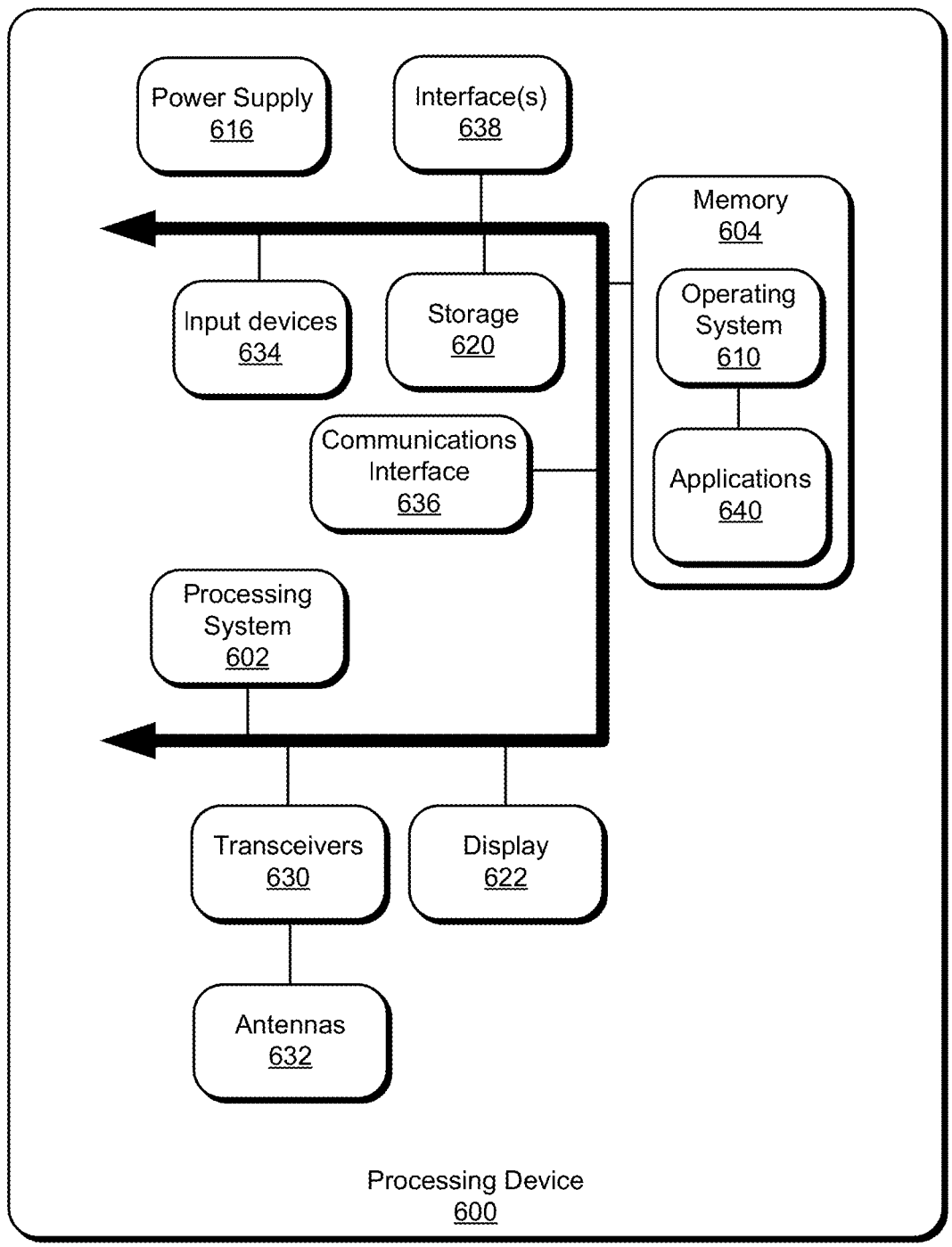
FIG. 6 illustrates an example schematic of a processing device that may be suitable for implementing aspects of the disclosed technology.

FIG. 6 illustrates an example schematic of a processing device 600 that may be suitable for implementing aspects of the disclosed technology. The processing device 600 includes a processing system 602, memory 604, a display 622, and other interfaces 638 (e.g., buttons). The memory 604 generally includes both volatile memory (e.g., RAM) and non-volatile memory (e.g., flash memory). An operating system 610, such as the Microsoft Windows® operating system, resides in the memory 604 and is executed by the processing system 602, although it should be understood that other operating systems may be employed.

One or more applications 640, such as the anomalous IP detector 102 of FIG. 1 or any of its individual subcomponents are loaded in the memory 604 and executed on the operating system 610 by one or more processors of the processing system 602. Applications 640 may receive input from various input local devices (not shown) such as a microphone, keypad, mouse, stylus, touchpad, joystick, etc. Additionally, the applications 640 may receive input from one or more remote devices, such as remotely-located smart devices, by communicating with such devices over a wired or wireless network using more communication transceivers 630 and an antenna 632 to provide network connectivity (e.g., a mobile phone network, Wi-Fi®, Bluetooth®). The processing device 600 further includes storage 620 and a power supply 616, which is powered by one or more batteries and/or other power sources and which provides power to other components of the processing device 600. The power supply 616 may also be connected to an external power source (not shown) that overrides or recharges the built-in batteries or other power sources.

The processing device 600 may include a variety of tangible computer-readable storage media and intangible computer-readable communication signals. Tangible computer-readable storage can be embodied by any available media that can be accessed by the processing device 600 and includes both volatile and nonvolatile storage media, removable and non-removable storage media. Tangible computer-readable storage media excludes intangible and transitory communications signals and includes volatile and nonvolatile, removable, and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 600. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

In some aspects, the techniques described herein relate to a method including: receiving a request to access a target resource from a source IP address; identify a relevant address group for the source IP address from among a plurality of address groups, each of the address groups including IP addresses that satisfy an address similarity criterion defined for the group; identifying, with a machine learning model, a group of similar resources for the target resource, the machine learning model trained to on connection history data indicating which of the address groups have previously accessed each different resource of a plurality of resources in a training dataset; predicting a probability of receiving a legitimate new access request for the target resource from the relevant address group based on the connection history data associated with the relevant address group and each of the similar resources; and in response to determining that the probability falls below a defined threshold, denying the request to access the target resource.

In some aspects, the techniques described herein relate to a method, wherein the address similarity criterion is satisfied when the IP addresses of a given group are characterized by at least one of a same autonomous system number (ASN) and a same geographic location.

In some aspects, the techniques described herein relate to a method, wherein the resource similarity identifier determines a similarity score quantifying similarity between the target resource and each resource of the group of similar resources, the similarity score being based at least in part on a determined number of the address groups that have previously accessed both the target resource and the resource.

In some aspects, the techniques described herein relate to a method, wherein predicting the probability of the new request is further based on the similarity score determined with respect to the target resource and each resource of the target resource group.

In some aspects, the techniques described herein relate to a method, further including training the machine learning model by training operations that include: receive a training dataset that includes a feature vector corresponding to each resource of a plurality of resources, the feature vector for each of the resources in the training dataset indicating a subset of the address groups that have previously accessed the resource; transform, with the resource similarity identifier, each of the feature vectors into a resource vector based on a connection history similarity metric determined for each pair of the resources in the training dataset, the resource vectors being defined within a same latent vector space.

In some aspects, the techniques described herein relate to a method, wherein a distribution of resource vectors in the same latent vector space corresponds to the connection history similarity metric observed with respect to each pair of resource in the training dataset, the connection history similarity metric indicating a number of the address groups that previously accessed each resource of the pair.

In some aspects, the techniques described herein relate to a method, further including: in response to determining that the probability exceeds the defined threshold, granting the request to access the target resource.

In some aspects, the techniques described herein relate to a system for dynamically determining legitimacy of a source internet protocol (IP) address requesting access to a target resource, the system including: an IP address classifier stored in memory and executable to: identify a relevant address group for the source IP address from among a plurality of address groups, each of the address groups consisting of IP addresses that satisfy an address similarity criterion defined for the group; a resource similarity identifier stored in memory and executable to identify a group of similar resources for the target resource based on commonalities in a first subset of the address groups that have previously accessed the target resource and subsets of the address groups that have accessed each of the similar resources; a connection legitimacy prediction engine stored in memory any executable to predict a probability of receiving a legitimate new request to access the target resource from the relevant address group based on connection history data associated with the relevant address group and each of the similar resources, wherein the system denies the request to access the target resource in response to determining that the probability falls below a defined threshold.

In some aspects, the techniques described herein relate to a system, wherein the address similarity criterion is satisfied when the IP addresses of a given group are characterized by at least one of a same autonomous system number (ASN) and a same geographic location.

In some aspects, the techniques described herein relate to a system, wherein the connection legitimacy prediction engine predicts the probability of the legitimate new request based on both the connection history data associated with each of the similar resources and a similarity score determined with respect to the target resource and each resource of the target resource group.

In some aspects, the techniques described herein relate to a system, wherein the resource similarity identifier determines the similarity score quantifying similarity between the target resource and each resource of the group of similar resources, the similarity score being based at least in part on a determined number of the address groups that have previously accessed both the target resource and the resource.

In some aspects, the techniques described herein relate to a system, wherein the resource similarity identifier includes a model trained on connection history data for each of a plurality of resources, the plurality of resources including the group of similar resources.

In some aspects, the techniques described herein relate to a system, wherein the trained model includes a vector space including a plurality of resources vectors each corresponding to an associated one of the plurality of resources, and wherein a distribution of the resource vectors in the vector space corresponds to a connection history similarity metric observed with respect to each pair of resources in the training dataset, the connection history similarity metric indicating a number of the address groups that previously accessed each resource of the pair.

In some aspects, the techniques described herein relate to a system, wherein the system grants the request to access the target resource in response to determining that the probability exceeds the defined threshold.

In some aspects, the techniques described herein relate to one or more computer readable storage media encoding processor-executable instructions for executing a computer process for determining legitimacy of a source internet protocol (IP) address requesting access to a target resource, the computer process including: identifying a relevant address group for the source IP address from among a plurality of address groups, each of the address groups consisting of IP addresses that satisfy an address similarity criterion defined for the group; identifying a group of similar resources for the target resource based on commonalities in a first subset of the address groups that have previously accessed the target resource and subsets of the address groups that have accessed each of the similar resources; predicting a probability of receiving a legitimate new request to access the target resource from the relevant address group based on connection history data associated with the relevant address group and each of the similar resources; and denying the request to access the target resource in response to determining that the probability falls below a defined threshold.

In some aspects, the techniques described herein relate to one or more computer-readable storage media, wherein the address similarity criterion is satisfied when the IP addresses of a given group are characterized by at least one of a same autonomous system number (ASN) and a same geographic location.

In some aspects, the techniques described herein relate to one or more computer-readable storage media, wherein the group of similar addresses further includes determining a similarity score quantifying similarity between the target resource and each resource of the group of similar resources, the similarity score being based at least in part on a determined number of the address groups that have previously accessed both the target resource and the resource.

In some aspects, the techniques described herein relate to one or more computer-readable storage media, wherein predicting the probability is based on both the connection history data associated with each of the similar resources and a similarity score determined with respect to the target resource and each resource of the target resource group.

In some aspects, the techniques described herein relate to one or more computer-readable storage media, wherein the similarity score quantifies similarity between the target resource and each resource of the group of similar resources, the similarity score being based at least in part on a determined number of the address groups that have previously accessed both the target resource and the resource.

In some aspects, the techniques described herein relate to one or more computer-readable storage media, wherein identifying the group of similar resources is performed with a machine learning model trained to on connection history data indicating which of the address groups have previously accessed each different resource of a plurality of resources in a training dataset.

In some aspects, the techniques described herein relate to a system for dynamically determining legitimacy of a source internet protocol (IP) address requesting access to a target resource, the system including: a means for identifying a relevant address group for the source IP address from among a plurality of address groups, each of the address groups consisting of IP addresses that satisfy an address similarity criterion defined for the group; a means for identifying a group of similar resources for the target resource based on commonalities in a first subset of the address groups that have previously accessed the target resource and subsets of the address groups that have accessed each of the similar resources; and a means for predicting a probability of receiving a legitimate new request to access the target resource from the relevant address group based on connection history data associated with the relevant address group and each of the similar resources, wherein the system denies the request to access the target resource in response to determining that the probability falls below a defined threshold.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A method comprising:
   receiving a request to access a target resource from a source address;
      identifying a relevant address group for the source address from among a plurality of address groups, the relevant address group comprising internet protocol (IP) addresses satisfying an address similarity criterion;
   identifying, with a machine learning model, a group of resources previously-accessed by at least some IP addresses in the relevant address group, the machine learning model trained to on connection history data indicating which of the plurality of address groups have accessed resources in a training dataset;
   predicting a probability of receiving a legitimate new access request for the target resource from the relevant address group based on the connection history data associated with the relevant address group and the group of resources; and
   in response to determining that the probability falls below a defined threshold, denying the request to access the target resource.

2. The method of claim 1, wherein each address group of the plurality of address groups includes IP addresses characterized by at least one of a same autonomous system number (ASN) and a same geographic location.

3. The method of claim 1, wherein identifying the group of resources further includes computing a similarity score quantifying similarity between the target resource and each resource of the group of resources, the similarity score being based at least in part on a determined number of the address groups that have previously accessed both the target resource and the resource.

4. The method of claim 3, wherein predicting the probability of the legitimate new access request is further based on the similarity score determined with respect to the target resource and each resource of the group of similar resources.

5. The method of claim 1, further comprising training the machine learning model by training operations that include:
receive the training dataset, the training dataset including a feature vector corresponding to each resource of a plurality of resources, the feature vector identifying a subset of the address groups that have previously accessed the resource;
transform each of the feature vectors into a resource vector based on a connection history similarity metric determined for each pair of the resources in the training dataset, the resource vectors being defined within a same latent vector space.

6. The method of claim 5, wherein a distribution of resource vectors in the same latent vector space corresponds to the connection history similarity metric observed with respect to each pair of resource in the training dataset, the connection history similarity metric indicating a number of the address groups that previously accessed each resource of the pair.

7. The method of claim 1, further comprising:
in response to determining that the probability exceeds the defined threshold, granting the request to access the target resource.

8. A system for dynamically determining legitimacy of a source address requesting access to a target resource, the system comprising:
an internet protocol (IP) address classifier stored in memory and executable to: identify a relevant address group for the source address from among a plurality of address groups, the relevant address group comprising IP addresses satisfying an address similarity criterion;
a resource similarity identifier stored in the memory and executable to identify a group of similar resources for the target resource based on commonalities in a first subset of the address groups that have previously accessed the target resource and subsets of the plurality of address groups that have accessed the similar resources;
a connection legitimacy prediction engine stored in the memory and executable to predict a probability of receiving a legitimate new request to access the target resource from the relevant address group based on connection history data associated with the relevant address group and the group of similar resources, wherein the system prevents the source address from accessing the target resource in response to determining that the probability falls below a defined threshold.

9. The system of claim 8, wherein each of the plurality of address groups includes IP addresses characterized by at least one of a same autonomous system number (ASN) and a same geographic location.

10. The system of claim 8, wherein the connection legitimacy prediction engine predicts the probability of the legitimate new request based on both the connection history data associated with each of the similar resources and a similarity score determined with respect to the target resource and each resource of the group of similar resources.

11. The system of claim 10, wherein the resource similarity identifier determines the similarity score quantifying similarity between the target resource and each resource of the group of similar resources, the similarity score being based at least in part on a determined number of the address groups that have previously accessed both the target resource and the resource.

12. The system of claim 8, wherein the resource similarity identifier includes a model trained on connection history data for each of a plurality of resources, the plurality of resources including the group of similar resources.

13. The system of claim 12, wherein the trained model includes a vector space including a plurality of resources vectors each corresponding to an associated one of the plurality of resources, and wherein a distribution of the resource vectors in the vector space corresponds to a connection history similarity metric observed with respect to each pair of resources in a training dataset, the connection history similarity metric indicating a number of the address groups that previously accessed each resource of the pair.

14. The system of claim 8, wherein the system grants the request to access the target resource in response to determining that the probability exceeds the defined threshold.

15. One or more tangible processor-readable storage media encoding processor-executable instructions for executing a computer process for determining legitimacy of a source address requesting access to a target resource, the computer process comprising:
identifying a relevant address group for the source address from among a plurality of address groups, the relevant address group comprising internet protocol (IP) addresses satisfying at least one address similarity criterion;
identifying a group of similar resources for the target resource based on commonalities in a first subset of the address groups that have previously accessed the target resource and subsets of the address groups that have accessed the similar resources;
predicting a probability of receiving a legitimate new request to access the target resource from the relevant address group based on connection history data associated with the relevant address group and the group of similar resources; and
denying the request to access the target resource in response to determining that the probability falls below a defined threshold.

16. The one or more processor-readable storage media of claim 15, wherein the address similarity criterion is satisfied when the IP addresses of a given group are characterized by at least one of a same autonomous system number (ASN) and a same geographic location.

17. The one or more processor-readable storage media of claim 15, wherein the group of similar addresses further includes determining a similarity score quantifying similarity between the target resource and each resource of the group of similar resources, the similarity score being based at least in part on a determined number of the address groups that have previously accessed both the target resource and the resource.

18. The one or more processor-readable storage media of claim 15, wherein predicting the probability is based on both the connection history data associated with each of the similar resources and a similarity score determined with respect to the target resource and each resource of the group of similar resources.

19. The one or more processor-readable storage media of claim 15, wherein the similarity score quantifies similarity between the target resource and each resource of the group of similar resources, the similarity score being based at least in part on a determined number of the address groups that have previously accessed both the target resource and the resource.

20. The one or more computer-readable storage media of claim 15, wherein identifying the group of similar resources is performed with a machine learning model trained to on connection history data indicating which of the address groups have previously accessed each different resource of a plurality of resources in a training dataset.

* * * * *